United States Patent
Lu et al.

(10) Patent No.: US 10,719,314 B2
(45) Date of Patent: Jul. 21, 2020

(54) PROBABILISTIC CALL-GRAPH CONSTRUCTION

(71) Applicant: Oracle International Corporation, Redwood Shores, CA (US)

(72) Inventors: Yi Lu, Brisbane (AU); Daniel Wainwright, Brisbane (AU); Michael Reif, Darmstadt (DE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 38 days.

(21) Appl. No.: 16/200,045

(22) Filed: Nov. 26, 2018

(65) Prior Publication Data

US 2020/0167155 A1    May 28, 2020

(51) Int. Cl.
*G06F 17/00* (2019.01)
*G06F 8/75* (2018.01)
*G06F 8/20* (2018.01)
*G06F 8/41* (2018.01)
*G06F 17/18* (2006.01)
*G06F 16/901* (2019.01)

(52) U.S. Cl.
CPC .............. *G06F 8/75* (2013.01); *G06F 8/24* (2013.01); *G06F 8/433* (2013.01); *G06F 16/9024* (2019.01); *G06F 17/18* (2013.01)

(58) Field of Classification Search
CPC ... G06F 8/24; G06F 8/433; G06F 8/75; G06F 16/9024; G06F 17/18
USPC ........................................................ 717/120
See application file for complete search history.

(56) References Cited

U.S. PATENT DOCUMENTS

| 2008/0177756 A1* | 7/2008 | Kosche et al. ...... | G06F 11/3447 702/127 |
| 2011/0313548 A1* | 12/2011 | Taylor et al. ....... | G06F 16/9024 707/706 |

(Continued)

OTHER PUBLICATIONS

Zhu et al., "Symbolic Pointer Analysis Revisited", PLDI'04 Jun. 9-11, 2004, Washington DC, USA, 13 pages.

(Continued)

*Primary Examiner* — Wei Y Zhen
*Assistant Examiner* — Mohammed N Huda
(74) *Attorney, Agent, or Firm* — Hickman Palermo Becker Bingham LLP

(57) ABSTRACT

Embodiments construct a precise and scalable call graph that models potentially incomplete object-oriented program code, including libraries. The call graph encodes the probabilities of call relationships in the graph, where the probabilities are based on context information from the program, and are adjusted based on client configurations. Embodiments derive topics to associate with unknown elements, as well as probabilities for those topics, from declared types of the unknown elements. Configuration information encodes sets of feature conditions that direct the weighting of the unknown element types. As embodiments propagate type tuples through the graph, the probabilities of the types for each node are recalculated based on the type/probability information for the predecessors of the node. Type/probability information joins are necessary for nodes with multiple dependencies, where the manner of the join is configurable by the client.

20 Claims, 8 Drawing Sheets

(56) References Cited

U.S. PATENT DOCUMENTS

2012/0036103 A1\* 2/2012 Stupp et al. ............ G06F 17/18
706/58
2019/0236475 A1\* 8/2019 Jagota et al. ....... G06F 16/9024

OTHER PUBLICATIONS

Whaley et al., "CloningBased ContextSensitive Pointer Alias Analysis Using Binary Decision Diagrams", dated Jun. 2004, 14 pages.
Sundaresan et al., "Practical Virtual Method Call Resolution for Java", dated 2000, 17 pages.
Shivers, Olin, "Control-Flow Analysis of Higher-Order Languages", School of Computer ScienceCarnegie Mellon University, dated May 1991, 200 pages.
Reif et al., "Call Graph Construction for Java Libraries", ACM dated Nov. 2016, 13 pages.
Lhotak et al., "Context-sensitive points-to analysis: is it worth it?", Sable Technical Report No. 2005-2, dated Oct. 21, 2005, 17 pages.
Grove et al., "Call Graph Construction in Object-Oriented Languages", OOPSLA, 1997 Conference Proceedings, 17 pages.
Dwyer et al., "Probabilistic Program Analysis", Springer International Publishing dated 2015, 25 pages.
Dean et al., "Optimization of Object-Oriented Programs Using Static Class Hierarchy Analysis", ECOOP dated Aug. 1995, 25 pages.
Bacon et al., "Fast Static Analysis of C++ Virtual Function Calls", ACM Conference on Object-Oriented Programming Systems, Languages and Applications, dated Oct. 1996, 19 pages.

\* cited by examiner

202 — CREATE A TYPE-PROPAGATION GRAPH THAT MAPS CALL RELATIONSHIPS BASED ON PARTICULAR COMPUTER CODE, WHERE THE TYPE-PROPAGATION GRAPH COMPRISES A PLURALITY OF NODES THAT REPRESENT RESPECTIVE PROGRAM VARIABLES THAT ARE REFERRED TO IN THE PARTICULAR COMPUTER CODE

204 — IDENTIFY ONE OR MORE TYPES THAT ARE ASSOCIATED, IN THE PARTICULAR COMPUTER CODE, WITH A PARTICULAR PROGRAM VARIABLE THAT IS REPRESENTED BY A GIVEN NODE OF THE GRAPH

206 — DETERMINE A RESPECTIVE PROBABILITY VALUE FOR EACH OF THE ONE OR MORE TYPES THAT ARE ASSOCIATED WITH THE PARTICULAR PROGRAM VARIABLE, WHERE THE PROBABILITY VALUE FOR A PARTICULAR TYPE, OF THE ONE OR MORE TYPES, REPRESENTS A PROBABILITY THAT THE PARTICULAR PROGRAM VARIABLE IS OF THE PARTICULAR TYPE DURING ANY GIVEN EXECUTION OF THE PARTICULAR COMPUTER CODE

208 — ASSOCIATE THE GIVEN NODE WITH ONE OR MORE TYPETUPLES, EACH OF WHICH INCLUDES INFORMATION IDENTIFYING A RESPECTIVE TYPE OF THE ONE OR MORE TYPES AND THE DETERMINED PROBABILITY VALUE THAT WAS IDENTIFIED FOR THE PARTICULAR TYPE

210 — PROPAGATE TYPETUPLES ACROSS THE PLURALITY OF NODES

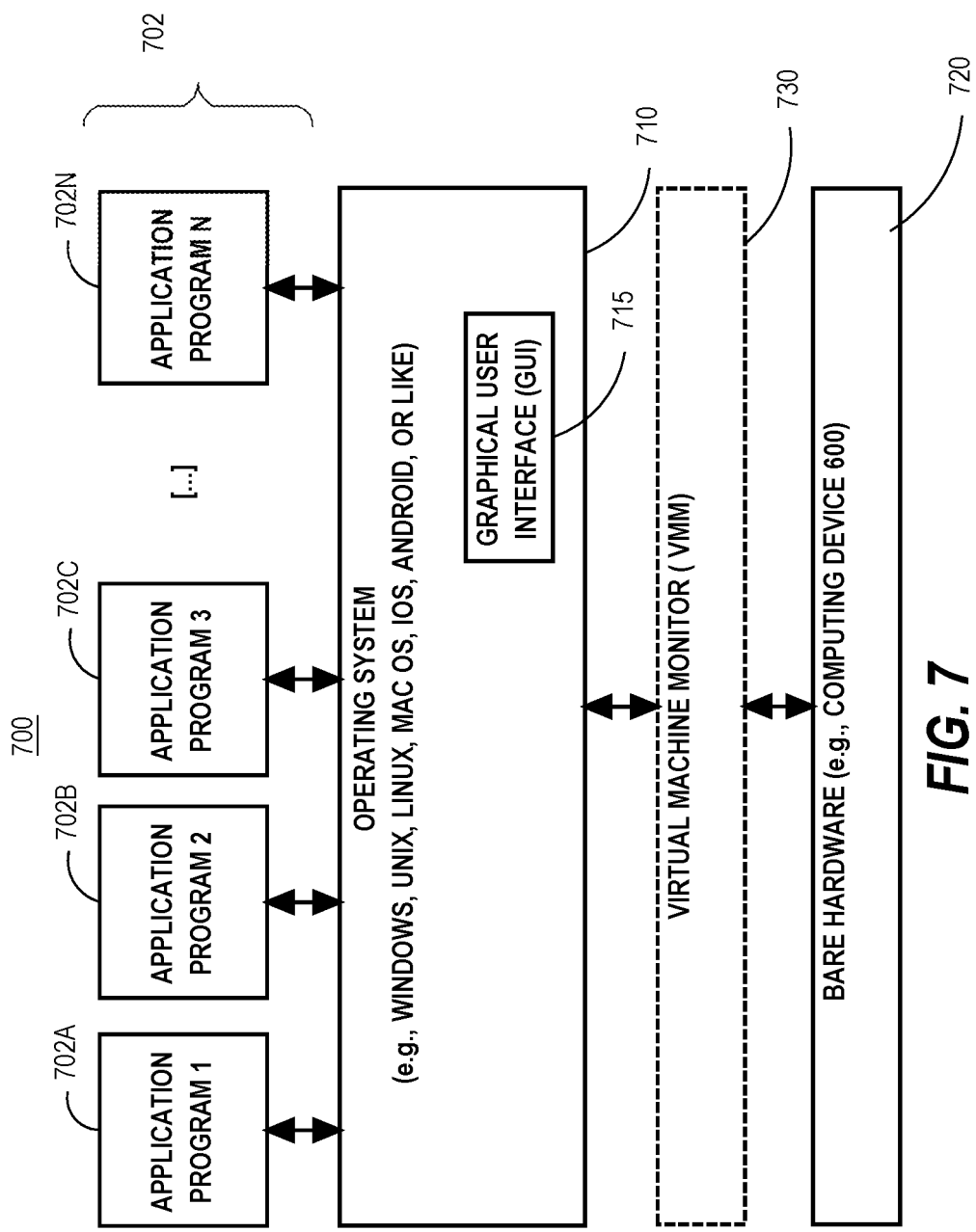

PROBABILISTIC CALL-GRAPH CONSTRUCTION

FIELD OF THE INVENTION

The present invention relates to static analysis of computer programs and, more specifically, to generating call graphs that map call relationships and program variable types for a given computer program.

BACKGROUND

Static program analysis is the analysis of computer programs that is performed at compile-time without requiring execution of the programs. For example, some types of inter-procedural static analysis, run over a given computer program, generate a call graph that maps calling relationships between program variables that are present in the program. Call graphs are fundamental for many applications, such as those performing bug detection, compiler optimization, program understanding tools, etc.

More specifically, a call graph is a control flow graph that represents calling relationships between methods, functions, and/or procedures in a computer program embodied in particular computer code. A call graph for a particular computer program is comprised of nodes representing program variables referred to in the code, and edges representing calling relationships between the program variables. A program variable may be an object instantiated in the computer program, a call site at which a particular call is made in the program, or any kind of subroutine of the program.

Many static analysis frameworks provide whole program analysis to generate call graphs, which works very well on procedural-based computer programs. However, unlike procedural-based programs, object-oriented programs may include dynamic dispatches, which prevent determining the exact calling relationships that will be present for the programs at run-time.

This indeterminacy in object-oriented programs has been a significant hurdle for practical use of object-oriented call graphs in real-world tools. In order to compensate for the lack of information regarding dynamic dispatches, static analysis techniques generally make overly-pessimistic assumptions about call graph edges. In other words, in order to cover all possible calling relationships that may result from dynamic dispatches in object-oriented programs, many call graph techniques over-approximate calling relationships between program variables, for example, by converging all possible data-flow or control-flow facts in the program into its call graph.

Moreover, whole program analysis may not be available for analyzing libraries, included in the code of a computer program being analyzed, because libraries depend on the application environment that is not available prior to run-time. Further, the increasing size of modern object-oriented libraries means that a highly-inclusive call graph modeling a very large object-oriented library may contain more information than could feasibly be used by a real-world application.

A call graph that over-approximates calling relationships in the subject program is not a precise representation of the modeled program at run-time given that highly-inclusive call graphs may include some call relationships that would never occur in actual runs of the program. This reduction in precision is sub-optimal for many applications that utilize call graphs, such as a bug detection algorithm that only requires information about those call relationships that are highly likely to be present at run-time.

In order to accommodate applications that require that every call relationship in a call graph be a call that certainly occurs at run-time, static analysis techniques may under-estimate the call relationships in the modeled program. Specifically, such techniques omit any call relationship that is not sure to be present at run-time from the call graph. Many times, such under-inclusive call graphs do not completely represent the modeled program at run-time because some of the call relationships that were omitted will actually be present at run-time. In this way, applications that rely on a call graph that under-estimates call relationships in the modeled program do not have access to information about all call relationships that will occur in the program at run-time.

A number of static analysis techniques attempt to mitigate the issues that arise when constructing call graphs that model object-oriented programming code. For example, Class Hierarchy Analysis (CHA) builds a class hierarchy from the subject computer code that may be used as a basis for building a call graph. Specifically, the resulting class hierarchy can be used to look up the subtypes or supertypes of a given type in the modeled program. However, CHA does not take into account functions or instances of objects within object-oriented programs.

Rapid Type Analysis (RTA) refines CHA by pruning methods in a CHA-based call graph that can never be reached, i.e., based on the enclosing class of the methods never being instantiated in the program. RTA is strictly more powerful than CHA, and is still very fast and simple. However, RTA does not work with dynamic dispatches found in many object-oriented programs.

Variable Type Analysis (VTA) further refines the principles behind RTA. Specifically, RTA collects all objects that can be created in the whole program and uses that information to prune the call graph edges. VTA goes a step further by collecting all variables that are instantiated in the whole program being analyzed and uses that information to prune the call graph edges, providing more precise information than is available from RTA. Like CHA and RTA, VTA is not field-sensitive. Also, VTA handles dynamic dispatches, which makes the technique useful for object-oriented programs. However, VTA does not address the problem of over- or under-approximation of calling relationships described above.

Furthermore, Control Flow Analysis of Order k (k-CFA) was initially formulated for functional languages, but has since evolved to support object-oriented languages. It is a points-to analysis with k-call-site-sensitivity, field-sensitivity, context-sensitive heap, and on-the-fly call graph construction, where k limits the length of the call string indicating those one or more methods from which another method was called. ZCWL is an algorithm that essentially performs a k-CFA analysis in which k is the maximum call depth in the original call graph after merging strongly connected components (SCCs). Because k is different for each program, the number of contexts is much more variable than in the other variations of context sensitivity. However, ZCWL is memory intensive. As such, for large object-oriented programs, ZCWL can fail to complete due to insufficient available memory. However, as with VTA, k-CFA and ZCWL do not address the problem of over- or under-approximation of calling relationships described above.

Analysis of incomplete program code, or of object-oriented code that includes dynamic dispatches, runs across issues that are inherently undecidable. Thus, no analysis algorithm can return both a precise and correct object-oriented call graph, where a precise call graph includes only those call relationships that occur during run-time, and a correct call graph includes all call relationships that occur during run-time. As a result, applications must use either precise (smaller) call graphs or correct (larger) call graphs, neither of which may fully answer the needs of the applications.

As indicated above, type-based techniques such as CHA, RTA, and VTA can build an imprecise call graph, typically useful when it is beneficial to quickly compile a call graph that scales to large programs. Points-to-based techniques such as k-CFA and ZCWL can build a more precise call graph at the loss of scalability. However, in addition to failing to address the problem of over- or under-approximation of calling relationships, none of these works has addressed the open-world problem where the analysis is performed on incomplete program code (such as libraries) that can interact with unknown code.

Thus, it would be beneficial to construct more precise call graphs that can handle incomplete program code, taking into account dynamic dispatching in object-oriented programs, without losing information about less-likely call relationships.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for propagating type tuples through a type-propagation graph.

FIG. 7 depicts a software system that may be used in an embodiment.

DETAILED DESCRIPTION

Figure 1:
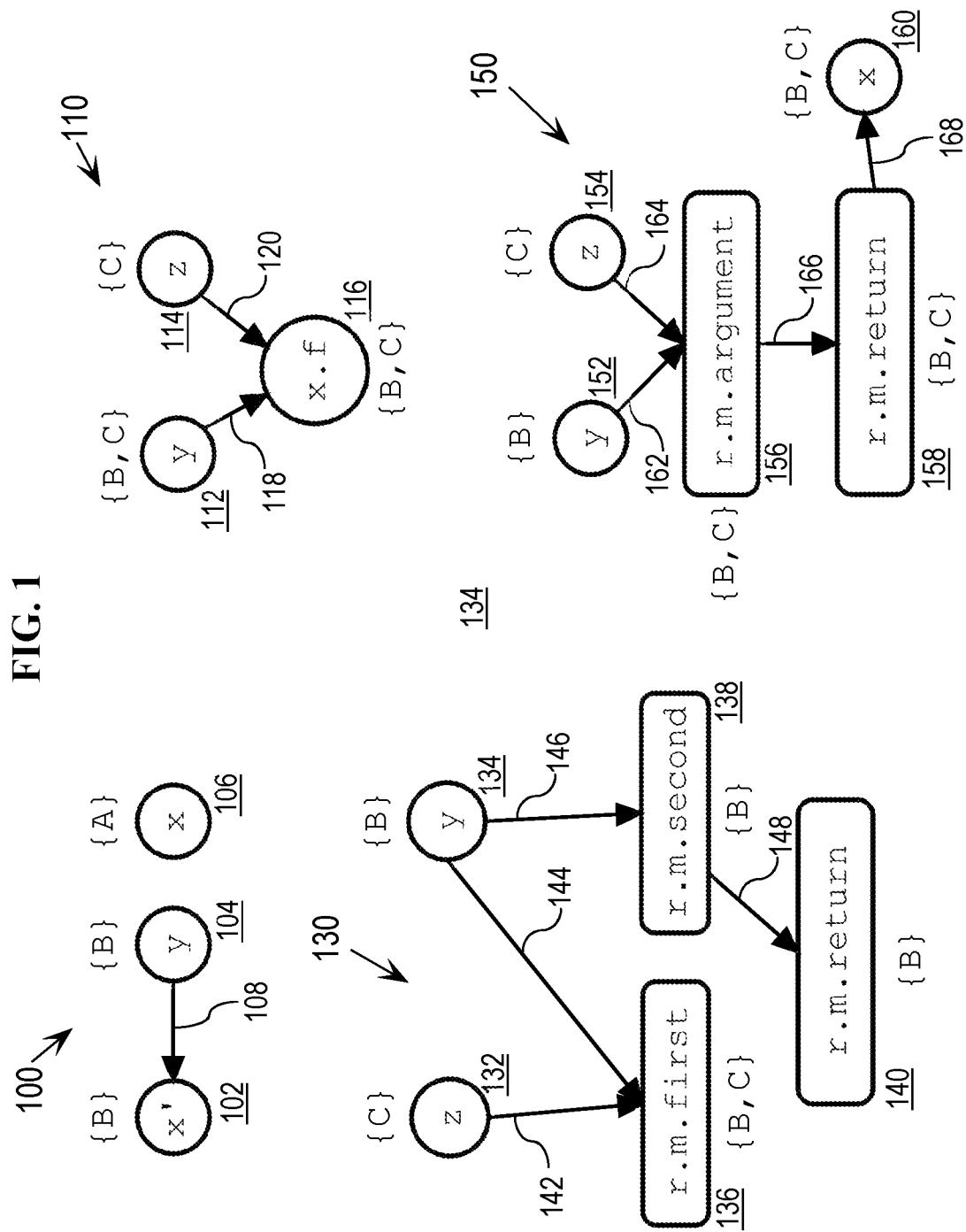
FIG. 1 depicts four data flow examples, each showing a type-propagation graph that models an associated data-flow operation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments perform a probabilistic-based static analysis technique to construct a precise and scalable call graph that models potentially incomplete object-oriented program code, including libraries. Instead of dealing with dynamic dispatches by over-approximating or under-approximating call relationships between program variables, the probabilistic call-graph construction analysis quantifies approximations that occur in program analysis, thereby statically predicting probabilities of each potential calling relationship in the graph. The inclusion of call relationship probabilities in the resulting call graph allows for prioritization of the calling relations in the graph. Specifically, because of the probability information, applications that consume the call graph are enabled to make informed decisions about which call relationships in the graph to utilize based on the tolerances of the application. Basing decisions on this more rich call graph data set allows application to produce more valuable static analysis results.

Specifically, embodiments construct a type-propagation graph to represent the structure of the computer program being modeled. The type-propagation graph includes nodes that represent the program variables and edges between the nodes that represent calling relationships in the program. Also, embodiments accommodate unknown program elements, such as entry point method arguments, return values from calls to unknown methods, and reads of fields with potentially unknown writes, which result from incomplete programming code representing the computer program being analyzed. As such, embodiments include, in the type-propagation graph, nodes representing the unknown elements found in the computer program being analyzed and also any information about call relationships for those nodes.

Embodiments then associate the nodes of the type-propagation graph with information about the types that the program variables represented by the nodes may assume during run-time. Embodiments track the probability of calling relationships in the computer program being modeled by assigning probabilities to the types associated with the graph nodes. The information about a given type assignment and the probability associated with the type assignment is referred to herein as a type tuple, where the associated probability represents the probability that at the program variable represented by the node to which the tuple is assigned will be of that type at run-time. The set of type tuples assigned to a given node is referred to herein as the type-probability set (TPS) of the node.

The tuple's probability is represented by a number between $P(0)$ and $P(1)$, from unlikely to likely, and expresses a type's certainty to reach a particular statement. According to an embodiment, described below, all probabilities that are contained in a single set are relative to each other and will, therefore, always sum up to 1. When two types in a set have the same probability, it implies that both types are equally likely to be available at this statement.

Embodiments propagate type tuples through the type-propagation graph. To set the type-propagation graph up for propagating type tuples, embodiments initially populate the graph with type tuples for all program variables for which type information is available, such as program variables associated with allocation sites in the program. The probability that is initially associated with a given type assigned to a known element is generated based on the circumstances of the associated program variable in the program.

Embodiments derive topics to associate with unknown element nodes, as well as probabilities for those topics, from the declared type that is used for the corresponding unknown program elements. However, the declared type of an unknown element may be a supertype that comprises many subtypes, each of which the unknown element may potentially assume at run-time. Thus, in order to provide meaningful information about these unknown elements in the final call graph, embodiments identify and refine the TPS for unknown elements based on user-configured criteria.

Specifically, embodiments allow clients to provide configuration information that associates, with each of one or more object supertypes, a respective set of feature conditions that direct the weighting of types for an unknown element that is associated, in the computer program being modeled, with the supertype. Such feature conditions may be based on programming patterns, programming rules, known contextual information (such as call sites that invoke the associated public method), etc. Application of associated probability adjustment instructions cause the probabilities of types that satisfy the conditions to be variously weighted. In this way, the TPS of an unknown element is generated based on the requirements of the client.

As embodiments propagate type tuples through the graph, embodiments recalculate the probabilities in the TPS of each node based on the TPSs of the one or more predecessors of the respective node. Whereas it is sufficient to simply propagate the TPS for node updates where the node has only a single dependency, TPS joins are necessary for nodes with multiple dependencies. According to embodiments, the way that the TPSs of multiple predecessors is joined to produce the TPS of a dependee node is configurable by the client.

According to an embodiment, the type tuples with which the type-propagation graph is initially populated are propagated throughout the graph until a fix point is reached. According to another embodiment, the configuration information includes a threshold of propagation, which allows users to control the amount of processing power it requires to generate the call graph. For example, the type tuples with which the type-propagation graph is initially populated are propagated throughout the graph until a predetermined number of propagation iterations, indicated in the configuration information, has been reached. As another example, user input directs that any given type tuple may be propagated only when the probability of the tuple exceeds a specified threshold. Basing propagation of type information on user configuration directives mitigates the potential of excess processing power being required to generate a call graph, such as in the case where a fix point is elusive given the indeterminate nature of object-oriented code.

The probability information that is thereby propagated throughout the graph allows for weighting the call relationships that correspond to the assigned types. Clients that consume the resulting call graph may tailor the graph to the needs of the application. For example, based on user configuration, embodiments cause that the final call graph contain only edges that exceed a predefined threshold.

Because of the propagation of probability information and the configurability of the call graph construction, final call graphs produced by embodiments contain all information requested by clients, but does not include excess information over what is needed by the client. Thus, the final call graph data is as small and efficient as possible, and consumer applications need not waste processing power sifting through extraneous call graph information. Furthermore, because of the precision of the final call graph, consumer application results are also able to be precise.

VTA Basics

According to embodiments, any call graph analysis approach may be used as a mechanism to generate a type-propagation graph, or to propagate information through the graph. Embodiments are described herein based on VTA because VTA offers a good trade-off between scalability and precision. However, embodiments are not limited to this call graph analysis technique, and another technique (such as CHA, LibCHA, context-sensitive CFA, etc.) may be used.

VTA generates a call graph representing a given computer program, where the call graph associates all program variables (including fields) in the computer program with a respective type set. The type set of a given program variable contains all possible types of objects that may be referenced by the variable. During generation of a given call graph, the core VTA algorithm propagates type information among program variables in the graph for each data-flow operation. The type set associated with each program variable is used to identify the target methods of any calls invoked on the variable.

Types are initially identified for program variables based on object allocations in the program code (i.e., using the new operation in Java/C++ like programming languages). These initially-identified types are then propagated to other program variables along the data-flow operations. For assignments, the type information is propagated from the type-set of the assigner variable (at a "predecessor" node) to the type-set of the assignee variable (at a "dependee" node).

VTA performs analysis on an intermediate representation of the subject computer program called the Static Single Assignment (SSA) form in which each local variable is renamed when it is assigned to a different value. Field writes propagate types to fields, and VTA converges all field assignments due to possible aliases of the receiver object. Method calls propagate types from actual parameters to the formal parameters, converging all call sites because VTA is context-insensitive. Similarly, method returns converge type information from different call sites on the same method and return the converged type information.

In summary, VTA uses more precise abstraction (types at allocation sites) for heap objects. Such a feature allows for more precise call graph construction than other type-based algorithms (such as CHA and RTA). On the other hand, VTA does not reason about aliases, and therefore provides better scalability than points-to-based algorithms.

VTA Call Graph Examples

Some example VTA type propagations are described below using graph examples depicted in FIG. 1. Specifically, FIG. 1 includes examples 100, 110, 130, and 150, each showing a type-propagation graph that models an associated computer program, the respective pseudocodes for which are indicated below.

Example 100:

| 1 | | A x = new A( ); |
| 2 | | B y = new B ( ); //B <:A |
| 3 | | |
| 4 | | x = Y; |

As shown in example 100 of FIG. 1, node 106 represents a program variable, x, which is assigned a new object instantiation of type A at line 1. Node 104 represents a program variable, y, which is assigned a new object instantiation of type B at line 2. As indicated in the comment, B is a subtype of A. Node 102 represents a program variable, x', which is formed in the SSA when variable x gets a new definition by being reassigned to object y at line 4, as represented by calling relationship 108. The program variable x' is of type B because x' gets assigned the object y, which is also of type B.

Example 110:

```
1  |  C z = new C( );
2  |  A y; //C <: B <: A
3  |  if (condition)
4  |      y = new B( );
5  |  else
6  |      y = new C( );
7  |  x.f = y;
8  |  x.f = z;
```

As shown in example 110 of FIG. 1, node 114 represents a program variable, z, that is assigned a new object instantiation of type C at line 1. At line 2, a program variable y of type A is instantiated, where type C is a subtype of type B, which is a subtype of type A, as indicated by the comment "C<: B<: A". Node 112 represents the program variable, y, which is assigned a new object instantiation that will either be of type B or type C, depending on the condition of the if statement of lines 3-6 at run-time. Thus, node 112 is labeled with the set of types {B, C}. Node 116 represents a field f of an object x, where x.f is assigned once to object y at line 7, as represented by calling relationship 118, and once to object z at line 8, as represented by calling relationship 120. The set of types that are propagated to node 116 is the union of the types associated with the program variables that are start nodes of call relationships for which node 116 is the end node, i.e., {B, C}.

Example 130:

```
1   |  A method (A first, A second){
2   |      //some code
3   |      return second;
4   |  }
5   |  //C <: B <: A
6   |  B y = new B( );
7   |  C z = new C( );
8   |
9   |  receiver.method(y, y);
10  |  receiver.method(z, y);
```

As shown in example 130 of FIG. 1, node 132 represents a program variable, z, which is assigned a new object instantiation of type C at line 7. Node 134 represents a program variable, y, which is assigned a new object instantiation of type B at line 6. Node 136 represents the parameter named first and node 138 represents the parameter named second, each of which are parameters of the method defined at lines 1-4. In example 130, the defined method is called once with object y as the first parameter at line 9, and once with object z as the first parameter at line 10. As such, node 136 is the end node of two calling relationships 142 and 144, with the start nodes of the two relationships being nodes 132 and 134, respectively. Thus, the union of the types associated with nodes 132 and 134 are propagated to node 136, i.e., {B, C}.

The method is called with object y as the second parameter at both of lines 9 and 10, and, as such, node 138 is the end node of calling relationship 146 for which node 134 is the start node. Thus, node 138 inherits the type set associated with node 134, i.e., {B}. The second parameter of the method is also the return value for the method at line 3. As such, node 140, which represents the return value of the method, is the end node of calling relationship 148 for which node 138 is the start node. Node 140 inherits the type set associated with node 138, i.e., {B}.

Example 150:

```
1   |  A method (A argument){
2   |      //some code
3   |      return argument;
4   |  }
5   |  //C <: B <: A
6   |  B y = new B ( );
7   |  C z = new C ( );
8   |
9   |  x = receiver.method(y);
10  |  receiver.method(z);
```

As shown in example 150 of FIG. 1, node 152 represents a program variable, y, which is assigned a new object instantiation of type B at line 6. Also, node 154 represents a program variable, z, which is assigned a new object instantiation of type C at line 7. Node 156 represents the argument parameter that is sent into the method defined at lines 1-4. In example 150, the method is called with both of objects y and z as the argument parameter at lines 9 and 10. As such, node 156 is the end node of two calling relationships 162 and 164, with the start nodes of the two relationships being nodes 152 and 154, respectively. Thus, the union of the types associated with nodes 152 and 154 are propagated to node 156, i.e., {B, C}.

The argument parameter of the method is returned from the method every time at line 3. As such, node 158, which represents the return value of the method, is the end node of calling relationship 166 for which node 156 is the start node. Node 158 inherits the type set associated with node 156, i.e., {B, C}.

In one case at line 9, a variable x is assigned to receive the return value from receiver.method(y). Thus, node 160, which represents program variable x, is the end node of calling relationship 168 for which node 158 is the start node. Node 160 inherits the type set associated with node 158, i.e., {B, C}. Example 150 illustrates over-approximation of call relationships because the variable x would only ever take on the type B, but the set of types assigned to node 160 is propagated from node 158, and includes more types than x would ever take on at run-time.

Constructing Type-Propagation Graphs

According to an embodiment, before computing the call graph for a given computer program, embodiments build up a type-propagation graph that represents the program variables and call relationships in the computer program. Since this step is concerned only with the codebase's internals, the process is almost the same as is performed by VTA, described above. According to embodiments, each node in the resulting type-propagation graph not only includes pointers to its dependees, but also includes pointers to its dependencies. This additional information facilitates computation of TPSs based on TPS joins of information from predecessor nodes. Furthermore, embodiments resolve virtual method invocations on-the-fly. Specifically, edges are added to the type-propagation graph for call sites as the type probabilities are being propagated through the graph, in particular to receivers of method calls, as described in further detail in connection with fix-point iteration below.

FIG. 2 depicts a flowchart 200 for propagating type tuples through a type-propagation graph, according to embodiments. Specifically, at step 202, a type-propagation graph that maps call relationships based on particular computer code is created, where the type-propagation graph comprises a plurality of nodes that represent respective program variables that are referred to in the particular computer code. For example, a computing device runs a call graph analysis application (CGAA) that creates a call graph that models a particular computer program according to embodiments.

An application or service, such as the CGAA, runs on a computing device and comprises a combination of software and allocation of resources from the computing device. Specifically, an application or service is a combination of integrated software components and an allocation of computational resources, such as memory, and/or processes on the computing device for executing the integrated software components on a processor, the combination of the software and computational resources being dedicated to performing the stated functions of the application or service.

Returning to the description of step 202, the CGAA analyzes a particular object-oriented computer program that comprises computer code. The CGAA generates a type-propagation graph that comprises nodes, which represent program variables in the computer program, and edges, which represent call relationships between the program variables. According to an embodiment, the type-propagation graph includes one or more nodes that represent one or more respective unknown elements, as well as edges that represent any call relationship information known for the unknown elements.

Figure 3:
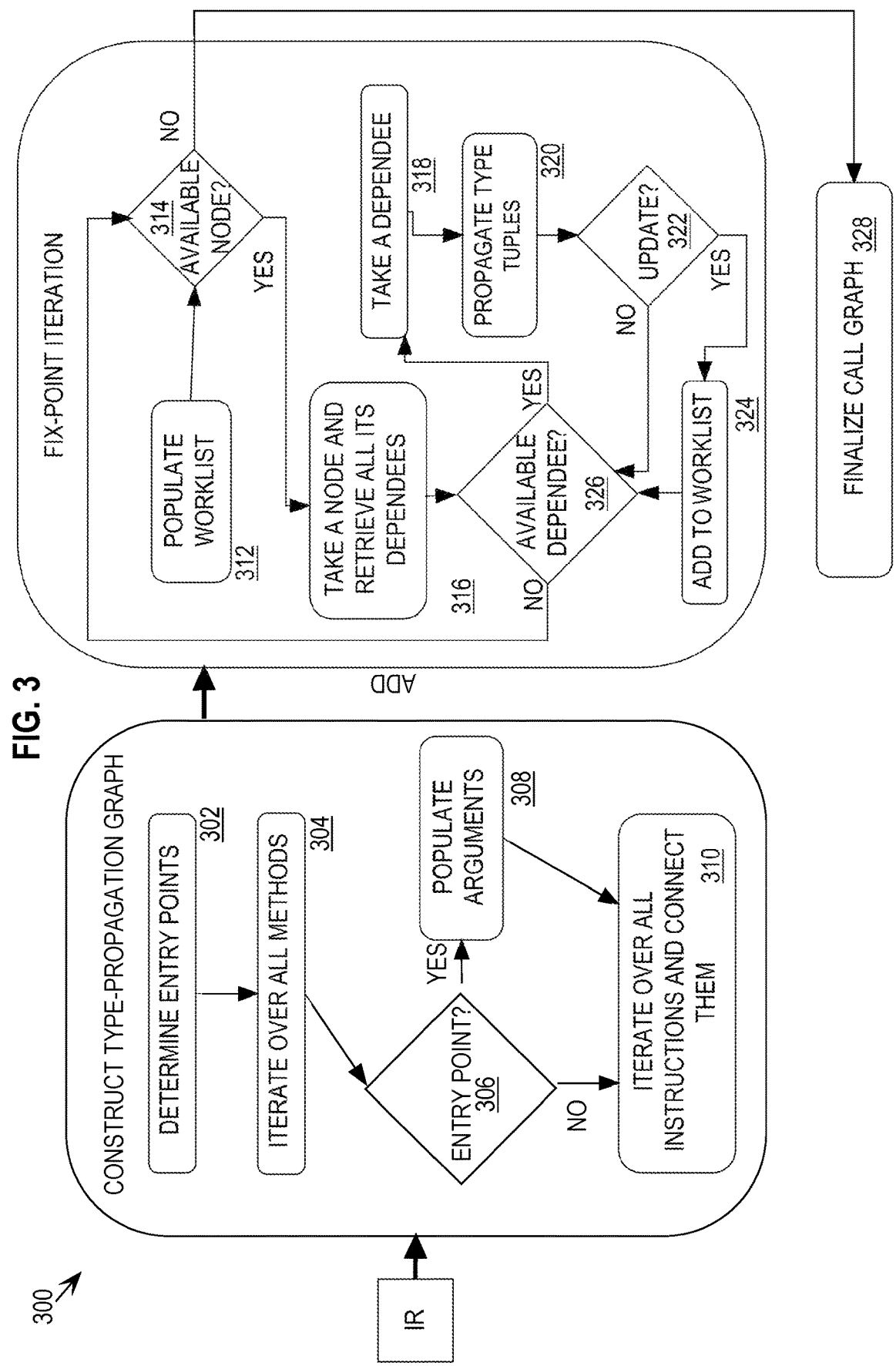
FIG. 3 depicts a flow chart of call-graph construction based on VTA using a worklist-based fix-point algorithm, according to an embodiment.

To illustrate, FIG. 3 shows a flow chart 300 of an example embodiment of type-propagation graph construction, which uses a worklist-based fix-point algorithm. Specifically, in the embodiment depicted in FIG. 3, based on an intermediate representation (IR) of the computer program being analyzed, the CGAA constructs a type-propagation graph at steps 302-310. At step 302, all entry points of the computer program are determined by steps 304-306. At step 304, the CGAA iterates over all methods in the intermediate representation, where a method represents a grouping of computer instructions (or a procedure) that may be invoked, as a group, by calling the method by its name and in its applicable context, such as an object in the context of which the method is defined.

At step 306, the CGAA determines whether each respective method is an entry point. According to an embodiment, an entry point method is any method that may potentially be invoked by any (possibly unknown) application. At step 308, for every entry point method, the CGAA creates nodes, in the graph, to represent the arguments for the respective method. According to embodiments, the CGAA also represents any other unknown elements found in the computer program as nodes in the graph. At step 310, the CGAA iterates over all instructions in the computer program and connects the nodes of the type-propagation graph with edges that represent the call relationships in the program.

Identifying Initial Type Tuples

Once the type-propagation graph is constructed, the CGAA uses information from the computer program to assign, to at least some of the nodes in the type-propagation graph, type tuples. Specifically, steps 204-208 are performed for each node of a set of nodes, in the type-propagation graph, that represent program variables that are associated, in the particular computer code, with type information. For example, program variables that are associated with new object allocations in the program being analyzed are explicitly associated with the types of those new objects. The type tuples resulting from this first phase of type information association are a starting point for the CGAA to propagate probabilities throughout the type-propagation graph, as described in connection with fix-point iteration below.

Returning to the discussion of flowchart 200, at step 204, one or more types that are associated, in the particular computer code, with a particular program variable that is represented by a given node, of the graph, are identified. For example, in type-propagation graph example 100 of FIG. 1, node 104 represents program variable y, which is assigned a new object of type B at line 2 of the associated pseudocode above. In this example, the CGAA identifies {B} to be the set of types that are associated with node 104 in the computer code. This is an example of an explicit association of a type with a program variable.

However, not all program variables can be assigned initial type tuples without ambiguity. For example, node 102 of example 100 is not explicitly associated with a type in the example pseudocode. However, because the node represents a known element (that is not from an incomplete portion of the code being analyzed), the node is a dependee of other nodes from which type information is propagated during the fix-point iteration phase.

In the case of unknown elements, such as entry-point method arguments, return values from calls to unknown methods, and reads of fields with potentially unknown writes, many times, nodes representing these program variables are not dependees of nodes in the graph from which type information may be propagated. Further, any nodes with type information from which unknown element nodes depend do not include all type information that is applicable to the unknown elements. According to an embodiment, a node that represents the unknown element retains information about the source of the unknown element, such as a reference to the method in which the element appears ("context method"), in the case of a, a source object The only information available to the VTA for an unknown element is the declared type (a) of any read field, (b) of any passed method argument of an entry point method, or (c) of the return type of any called method. According to an embodiment, it is assumed that all currently known subtypes of a declared type are available at run-time for the necessary points in the code.

For example, the CGAA identifies a library method that has two arguments: argString with the type java.lang.String, and argObject with the type java.lang.Object. The declared type of argString narrows the type of the element to a particular specific class from which certain information is known about the argument. Because there is only one potential type associated with this element, the probability of this type is P (1). In contrast, the type java.lang.Object is a superclass for virtually all other objects. This declared type gives almost no information about the argument. The TPS of argObject will be a set of all subtypes of the declared type, where the subtype relationship is transitive meaning that the declared type is also included in the resulting set.

The necessary assumption that an element may be any subtype of the associated declared type introduces imprecision into the call graph. However, by assigning weights to the possible subtypes of an unknown element based on client-configurable feature conditions, as described in detail below, embodiments distinguish between the potential myriad of types assigned to unknown elements.

Identifying Probabilities for Initially-Established Types

At step 206, a respective probability value for each of the one or more types that are associated with the particular program variable is determined, where the probability value for a particular type, of the one or more types, represents a probability that the particular program variable is of the particular type during any given execution of the particular computer code. Whereas probabilities can also be represented in any way, embodiments are described herein using a relative representation, i.e., the probabilities in a resulting type set will always add up to 1.

Figure 4A:
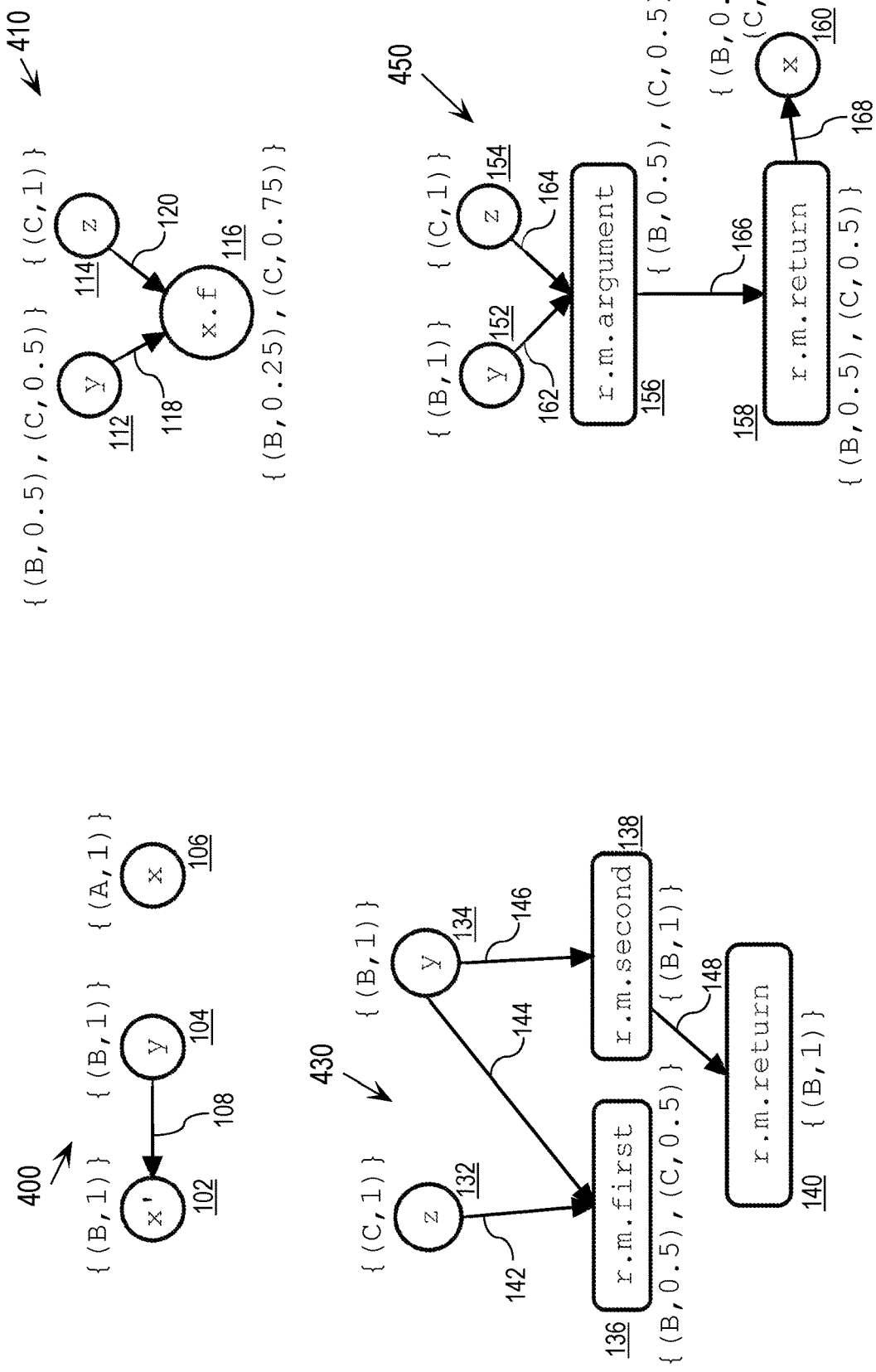
FIGS. 4A-B depict examples of type tuple propagation.

To illustrate, FIG. 4A depicts the four data flow examples 400, 410, 430, and 450 corresponding to the examples from FIG. 1, with each example in FIG. 4A showing a type-propagation graph with type tuples associated with the graph nodes. In example 400, the program variable y is associated with a new object allocation of type B. This is the only type information associated with y. Thus, the probability of y being associated with type B is P (1). Thus, as shown in example 400 in FIG. 4A, node 104 is associated with the type tuple (B, 1), which indicates that there is a 100% chance of program variable y being associated with type B.

In the case of example 410, the CGAA detects that y may be initiated as either type B or type C (as indicated in the if statement of lines 3-6 of example 110 above). As such, the CGAA associates node 112 with both of these potential types. According to an embodiment, CGAA splits the probability equally among the two types that y may be initiated as, i.e., (B, 0.5), (C, 0.5). According to another embodiment, the CGAA analyzes the condition of the if statement to determine the likelihood of y being instantiated as either type B or type C, and assigns probabilities to the two tuples based on the likelihood of the condition.

Approximate Unknown Context

According to one embodiment, for an unknown element, all potential types of the element are initially weighted equally in the TPS for the element. To illustrate, the example displayed in Listing 1, below, shows the type hierarchy of the program (lines 1-4) and an entry-point method (lines 7-9) that receives the root type of the type hierarchy as formal parameter objI, and then calls a method on the argument objI (line 8). To build a sound call graph, the CGAA assumes that the method call can be dispatched to all four target methods in lines 1-4. According to an embodiment, the CGAA initializes the probability values for each type available for objI based on an equal distribution of probability across all possible call targets. Four call targets would then imply P (0.25) per type.

```
Listing 1

1  |  interface I { void method ( ) {/* do something */}}
2  |  public class A { public void method( ) {/* do something */}}
3  |  class B { public void method ( ) {/* do something */}}
4  |  class C { public void method ( ) {/* do something */}}
5  |
6  |  public class API {
7  |    public static void apiMethod(I objI){
8  |      objI.method( );
9  |    }
10 |  }
```

However, allowing each potential type of an unknown element to share an equal probability does not necessarily give the client usable information. As such, embodiments approximate context for unknown elements by assigning probabilities to the types in the TPS of an unknown element based on distinguishable features of the types. Specifically, the TPS of an unknown element is adjusted based on an applicable set of feature conditions that guide adjustments of the probability values in the TPS. The sets of feature conditions that are applied, as well as the resulting effect on the probability values, is configurable by the client. This client-configured feature-based TPS construction tailors the information in the TPSs of unknown elements to the needs of client analysis.

According to an embodiment, the CGAA applies a default set of feature conditions to unknown elements associated with a declared type that is not explicitly indicated in the client configuration information. This default set of feature conditions (with associated probability adjustment instructions) is also configurable by the client.

Figure 5:
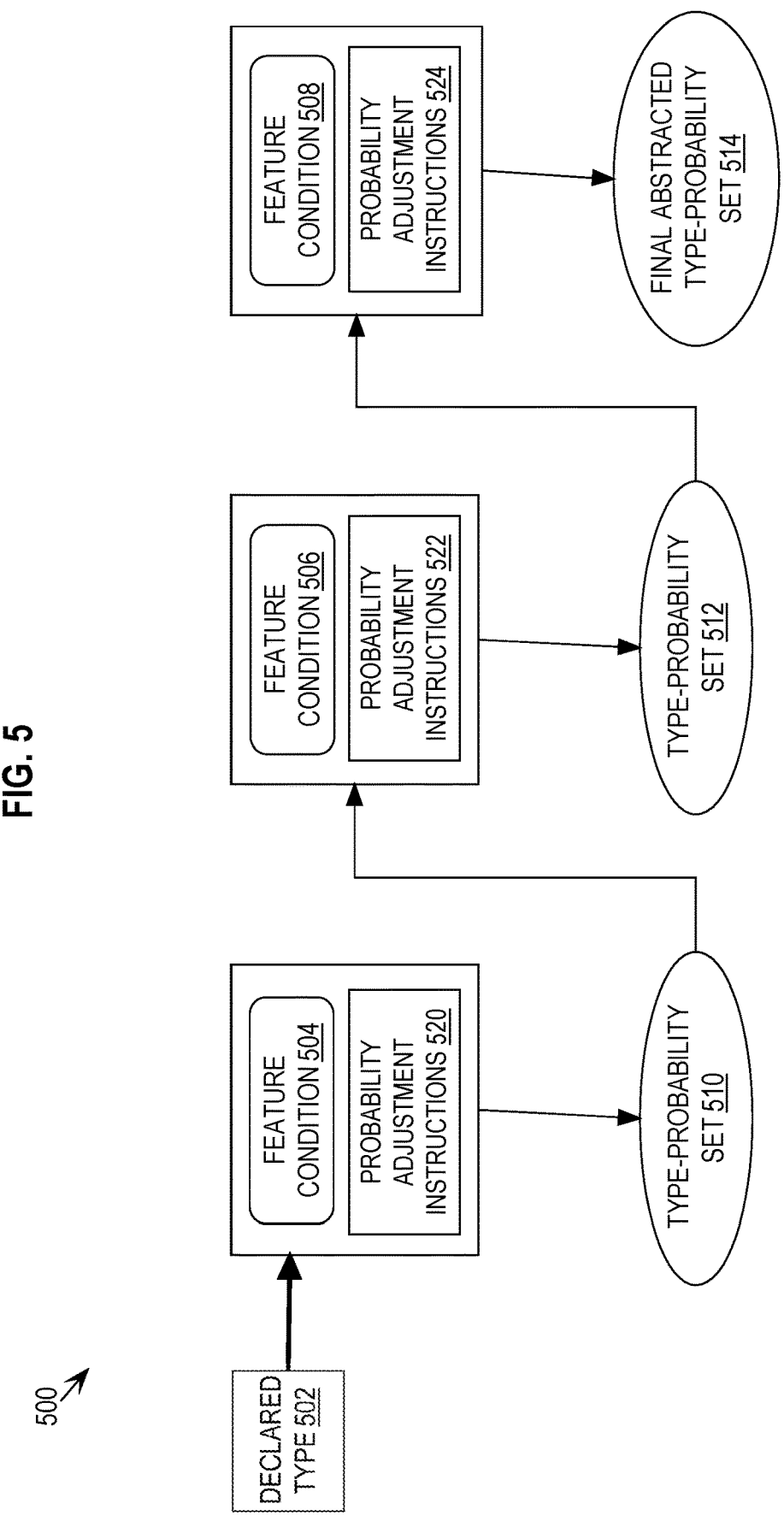
FIG. 5 depicts a flowchart for refining a type-probability set based on client-configurable feature conditions.

FIG. 5 depicts a flowchart 500 for refining a type-probability set based on client-configurable features. Configuration data, which is configurable by the client, associates each of one or more declared object types with a respective set of client-configured feature conditions to be used in adjusting the TPS of a given unknown element that is associated, in the code, with the declared type. FIG. 5 shows an example declared type 502 that is associated with a set of feature conditions 504-506. Each of these feature conditions is associated with a respective set of probability adjustment instructions, which dictates the effects of the associated feature condition. In the example of FIG. 5, application of the feature conditions in the set occurs serially, where application of each condition further refines the TPS of the subject node until a final TPS 514 is reached (to which all applicable feature conditions have been applied).

A feature condition may involve any aspect (or combination of aspects) of the structure of the program being analyzed, or of the context of the program being analyzed. Examples of features that may be taken into consideration include: whether the method in which the element appears (i.e., "context method") is public or private; how is a public context method being exported (are there certain conditions/privileges associated with usage of the context method); package visibility; types being passed into the context method at call sites in the computer code; if the type inherits from a given class; if the types being passed into the context method are constructible by users or are defined within a library (and not user constructible); whether the context method is in a particular enumerated set of methods; whether the context method is called at a call site located within a method that is in a particular enumerated set of methods; whether the type is declared in the same package as the context method; etc. Because the CGAA has access to all of the aspects of the program being analyzed, a feature condition may be any condition that is useful to the particular needs of the application of the client.

According to an embodiment, the CGAA determines whether a node qualifies for feature-based processing based on a qualifying condition for feature-based processing being met by the node, e.g., the program variable represented by the node is from incomplete code (such as being one of the types of unknown elements listed above), and the number of type tuples in the TPS of the node exceeds a predetermined threshold number. Upon determining that an unknown element qualifies for feature-based processing, the CGAA identifies a set of feature conditions to apply to the TPS of the node. Specifically, if the declared type associated with the element in the code is explicitly associated with a set of feature conditions in the configuration information, the CGAA applies that set of feature conditions to the TPS of the node. If the declared type associated with the element in the code is not associated with a set of feature conditions in the configuration information, the CGAA applies a default set of feature conditions to the TPS of the node.

When a type satisfies a feature condition in the applicable set of feature conditions, the probability value associated with the type is weighted as indicated by probability adjustment instructions associated with the feature condition. The probability adjustment instructions for a given feature condition can do any kind of adjustment to probability values.

For example, the probability value associated with a given type is scaled up when the type satisfies an applicable feature condition, or is scaled down when the type does not satisfy the feature condition. According to the embodiment in which all probabilities that are contained in a single TPS are relative to each other, the CGAA normalizes the probabilities in the final abstracted type-probability set 514 after all feature conditions have been applied to the TPS.

To illustrate an entry of a configuration file, the declared type java.lang.Object is associated with a set of feature conditions that includes a first feature condition that considers the types being passed into the context method at call sites of the context method in the computer code. In this example, the feature condition is "if the type is associated with the element at a call site" and the associated probability adjustment instructions are "then increase the probability of the type by 50%, else decrease the probability of the type by 5%".

In order to apply this feature condition to a particular unknown element that is associated with the declared type java.lang.Object, the CGAA first determines whether the element is associated with a context method, i.e., as recorded in metadata of the node. If the element is associated with a context method, the CGAA identifies all call sites of the context method in the computer program. For example, the context method is called one or more times within other methods in the library or within the computer program being analyzed (which utilizes the library). For each call site, the CGAA identifies a respective type of an object that corresponds to the unknown element, and records the type in a list of types. The CGAA then evaluates each type in the TPS of the node for the unknown element to determine whether the respective type is in the compiled list of types. If a given type is in the list of types, the CGAA automatically increases the probability associated with the type by 50%. If a given type is not in the list of types, the CGAA automatically decreases the probability associated with the type by 5%.

These call sites provide information about objects that are, indeed, used for the parameter at least a portion of the time. In this example, types that are known to be used as the unknown element (as shown in the identified call sites) are weighted differently than the other possible types for the element. Depending on client purposes, the known types may be weighted either more heavily than the other types for the element (such as for a bug analysis tool that requires more certainty as to the probability of the types) or may be weighted less heavily than the other types for the element (such as for a security analysis tool that focuses more processing on the types that are not known to be safely used, as evidenced by the call sites in the computer program).

As another example, a second feature condition in the set of feature conditions associated with java.lang.Object is a compound feature condition that indicates (a) "if the package in which the unknown element is found is public" and (b) "if the type is not associated with a module to which the package is exported". This compound feature condition is satisfied when both of the conditions are satisfied for a given type. The probability adjustment instructions associated with this second feature condition is "then set the probability value of the type to nil". According to an embodiment, a probability value that is set to nil remains nil after the TPS probabilities are normalized. This feature causes that types that cannot be used for the element be removed from consideration.

Each feature condition in an applicable set of feature conditions is applied to the type-probability set associated with the unknown element in question. Continuing with the discussion of FIG. 5, when feature condition 504 is applied to the initial TPS of a given unknown element, the probability value of any type in the initial TPS is adjusted according to probability adjustment instructions 520 associated with feature condition 504, as applicable. As such, TPS 510 depicted in FIG. 5 includes adjustments from applying instructions 520.

Then, feature condition 506 is applied to TPS 510, and the probability values of the types in TPS 510 are further adjusted according to probability adjustment instructions 522, which are associated with feature condition 506, as applicable. Thus, TPS 512 depicted in FIG. 5 includes adjustments from applying both of instructions 522 and instructions 520. Similarly, TPS 514 depicted in FIG. 5 includes adjustments from applying instructions 524, instructions 522, and instructions 520, as applicable. In this way, application of each feature condition further refines the TPS of the unknown element until a final TPS 514 is reached.

Fix Point Iteration: Populating a Type-Propagation Graph with Type Tuples

At step 208, a given node is associated with one or more type tuples, each of which includes information identifying a respective type of the one or more types and the determined probability value that was identified for the particular type. For example, the CGAA associates type tuples with each node for which the CGAA has initially identified types and associated probabilities (such as those derived from explicit associations in the computer program, and those derived from declared types and refined by feature condition application), where the type tuples record the initially-identified type and probability value information for the program variables represented by the nodes.

At step 210, type tuples are propagated across the plurality of nodes. For example, once all of the initially-identifiable type tuples are associated with the appropriate nodes in the type-propagation graph, the CGAA propagates type tuples throughout the type-propagation graph. According to the embodiment depicted in FIG. 3, at step 312, the CGAA initiates propagation of type tuples by populating a worklist with information that identifies all nodes in the type-propagation graph that have been associated with type tuples e.g., in connection with step 208.

At step 314 of FIG. 3, the CGAA determines whether there is an "available node" in the worklist, which records all nodes associated with TPS information that needs to be propagated to dependent nodes in the graph. If there is a node in the worklist, the CGAA removes the node from the worklist and retrieves information for all dependees of the node at step 316.

The CGAA then determines whether there is an available dependee from the retrieved dependees at step 326. If there is an available dependee (step 318), the CGAA propagates the type tuples from the predecessor nodes of the respective dependee (at step 320). Specifically, if needed, the CGAA adjusts the previously-calculated TPS of the dependee based on the current TPSs of all of the predecessor nodes, as discussed in detail below in connection with TPS joins. Because information for all predecessor TPSs are required to calculate the TPS of the dependee, the type-propagation graph includes information identifying the predecessor nodes of any given node. As indicated at step 322, if the TPS of the dependee is updated based on the TPSs of the predecessor nodes, then, at step 324, the CGAA adds information for the dependee to the worklist for further propagation of the updated TPS information. Once the CGAA has processed the TPS of the dependee, information for the dependee is removed from the identified list of dependees.

At step 326, the CGAA determines if there is an available dependee in the dependee list. If so, the CGAA returns to step 318 for the next dependee. If not, the CGAA returns to step 314 to determine if there is another node in the worklist to process. Returning to the discussion of step 322, if the TPS of the dependee was not changed, the CGAA moves straight to step 326 to determine if there is an additional dependee to process without including information for the just-processed dependee to the worklist.

At step 314, once there are no more nodes in the worklist, the CGAA finalizes the call graph based on the type-propagation graph at step 328. Thus, according to a worklist-based embodiment, the CGAA propagates type tuples through the type-propagation graph until of the TPSs of the nodes stop changing (i.e., become stable), at which point the graph has fully updated the graph to reflect the probabilities of the call relationships, as calculated based on client-provided instructions.

Performing TPS Joins

Nodes with exactly one predecessor, e.g., in an assignment such as is represented by nodes 102 and 104 in example 400 of FIG. 4A, are simple to process because the predecessor's TPS becomes the TPS of the updated node. However, when a node has multiple predecessors (e.g., as depicted in example 430 of FIG. 4A, where an argument node 136 has different program variables represented by nodes 132 and 134 passed in at dissimilar call sites), the TPS of the dependee is calculated by joining the TPSs of all known predecessors. For example, every time a predecessor of a node with multiple predecessors receives an update, embodiments compute a new TPS for the node using the TPSs of all predecessor nodes, instead of taking only the update source into consideration. The complete recomputation of TPSs avoids introduction of bias toward nodes that receive updates relatively often in the fix-point computation.

Joins may be executed according to any set of rules, which are configurable by the client. Examples below are described based on a rule indicating that predecessor TPSs are all weighted equally when joined to compute a dependee TPS. However, other rules may be applied to weight different predecessor TPSs differently. For example, client configuration information indicates that any tuple in a TPS that has less than a threshold probability should not be included in a join to calculated a dependee TPS. This configuration rule potentially reduces the amount of processing power required to bring a type-propagation graph to a fix-point during propagation, as indicated below. As another example, client configuration information indicates that any type that satisfies a feature condition (as described above in connection with unknown context) should be weighted as indicated in associated probability adjustment instructions.

As yet another example, clients may configure the CGAA such that only a predetermined number of the highest-probability topics are taken into consideration when performing a join. To illustrate, a first predecessor of a given node is associated with eight type tuples and a second predecessor of the node is associated with five type tuples. Given a client configuration causing the CGAA to take into account only the five highest-probability topics from the predecessors, the CGAA ranks the 13 tuples from the predecessor nodes by probability, and performs a join over the predecessor TPSs as if those five highest-probability tuples were the only tuples present in the parent TPSs. As yet another example, a client configuration causes the CGAA to weight types in the parent TPSs that are were derived from object allocations by 20% prior to performing the join.

Figure 4B:
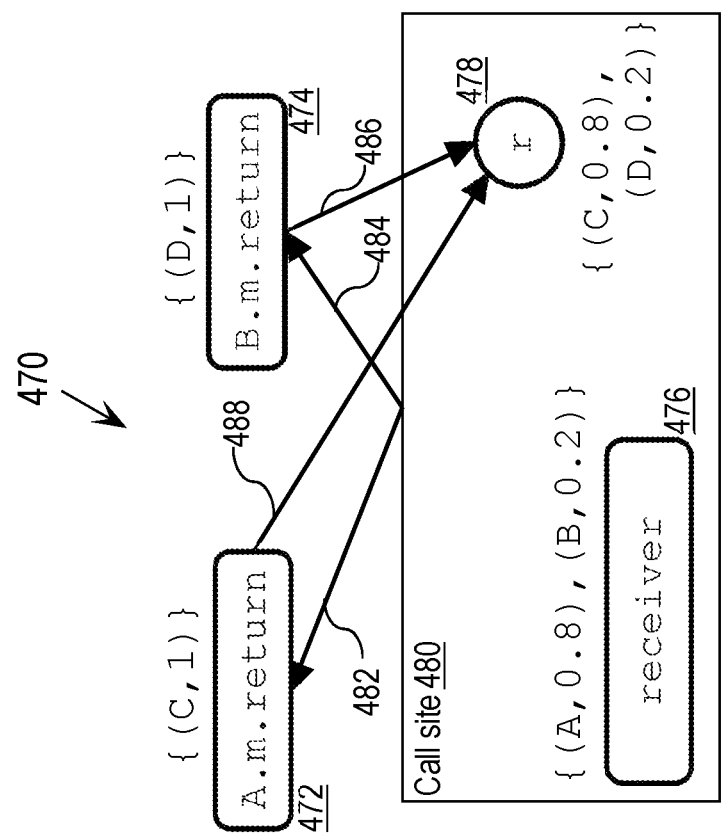

FIGS. 4A-B show examples of type tuple propagation. In example 410, which depicts a graph that models a field write, node 116, which represents the updated field, has exactly two predecessors, i.e., nodes 112 and 114. The computation of a TPS for node 116 would be relatively straight-forward if both predecessors held a singleton TPS (i.e., comprising a single tuple that represents a type with a probability of 100% or P (1)). In such a case, the resulting TPS for node 116 will either be: a singleton set when both predecessors have the same type; or a set with two tuples representing two different types with a probability of 50% each, according to an embodiment.

In the case of example 410, the CGAA initially determines the predecessor TPSs as $p_{112}{}^B$ and $p_{114}{}^C$. Based on this information, the CGAA performs a join of the predecessor TPSs to produce a TPS for node 116 of $p_{116}{}^{(B,0.5),(C,0.5)}$. Note that the notation $p_i{}^A$ identifies a predecessor node p that has the index i and a TPS that comprises type A. When no probability is indicated, the probability of the indicated type is implied to be P (1).

The CGAA continues analysis of the program and detects that y may also be initiated as type C. As such, the CGAA updates the TPS of node 112 to include a tuple with type C. According to an embodiment, CGAA splits the probability equally among the two types that y may be initiated as, i.e., $p_{112}{}^{(B,0.5),(C,0.5)}$. According to another embodiment, CGAA analyzes the condition of the if statement to determine the likelihood of y being instantiated as either type B or type C, and assigns probabilities to the two tuples accordingly.

When node 112 is updated to include the second type tuple, it is not enough to recompute the TPS of node 116 just by incorporating the updated predecessor. Specifically, following a naïve application of the updated predecessors, starting with the previously-calculated TPS of $p_{116}{}^{(B,0.5),(C,0.5)}$—which was calculated when each predecessor was associated with only one, distinct, type—and predecessor TPSs of $p_{112}{}^{(B,0.5),(C,0.5)}$ and $p_{114}{}^C$ the resulting TPS of node 116 will again be $p_{116}{}^{(B,0.5),(C,0.5)}$. However, this naive approach fails to properly account for the updated probabilities assigned to the types in both the predecessor TPSs.

Instead, embodiments compute the TPS of node 116 based on the latest-determined TPSs of all predecessors. According to an embodiment in which the probabilities of each predecessor is equally weighted in determining the TPS of node 116, the CGAA determines that the TPS of node 116 is $p_{116}{}^{(B,0.25),(C,0.75)}$.

According to an embodiment, the computation of the TPS of a program variable that receives the return value of a method call at a given call site is influenced by the likelihood of which method would be invoked at the call site. FIG. 4B shows a graph example 470, that models the following data-flow operations illustrating the point:

Example 470:

| 1  | | C A.method ( ) { |
| 2  | |   return new C ( ); |
| 3  | | } |
| 4  | | |
| 5  | | D B.method ( ) { |
| 6  | |   return new D ( ); |
| 7  | | } |
| 8  | | |
| 9  | | receiver = {(A,0.8), (B,0.2)} |
| 10 | | r = receiver.method ( ); |

As shown in example 470, node 472 represents the return value of the method of A, which is of type C, and node 474 represents the return value of the method of B, which is of type D. Call site 480 represents the method call at line 10 of example 470. This method call will either invoke A.method, as shown by edge 482, or invoke B.method, as shown by edge 484. Node 476 represents the receiver object, which, based on the available information, has an 80% chance of being of type A and a 20% chance of being of type B. Thus, the TPS of node 476 is (A, 0.8), (B, 0.2). Node 478 represents the object r that receives the return value from the method call (of either A.method, as shown by edge 488, or B.method, as shown by edge 486). Because the type of the receiver node directly affects which method is called between A.method and B.method, the TPS of node 478 is $p_{116}^{(C,0.8),(D,0.2)}$ or 80% probability of the return type of A.method (type C) and 20% probability of the return type of B.method (type D).

Increasing Efficiency of the Propagation Phase

A fix-point may not always be reached for type-propagation graphs since cycles in the type-propagation graph may introduce non-determinism into the computation TPSs. As such, embodiments are not monotonic. However, according to an embodiment, client configuration information includes one or more rules to ensure termination of the propagation phase and to limit the amount of processing power required to propagate the type tuples through the type-propagation graph. For example, in the configuration information, a client indicates a specific number of iterations that the CGAA should not exceed during the propagation phase. In this case, once the fix point or a certain number of iterations is reached, the call graph is implicitly available to the client. As another example, client configuration information includes type-propagation thresholds to adjust the performance of the propagation phase. One example of such rule is that a type may be propagated only when the probability of the type exceeds a specified threshold.

According to an embodiment, the tuples in each TPS are ordered by relative probability within the TPS. According to an embodiment, and based on ordered TPSs, propagation of type tuples is stopped when the TPSs are approximately equal, rather than strictly equal. TPSs are strictly equal when all tuples in the TPS calculated before the last iteration of propagation, and the tuples in the latest-calculated TPS are all the same. TPSs are approximately equal when a particular number of tuples in the TPSs are the same, where the particular number of tuples is client-configurable. When tuples are ordered by probability, using approximate equality in the fix point iterations allows for comparison of a certain number of the most probable type tuples when determining whether fix point has been reached. Comparison of at most a set number of tuples during propagation eliminates the need to propagate changes to types with less probability, which leads to more quick resolution of the propagation phase.

Propagation Issues for Call Site Nodes

Call site nodes can be more complex than other node types, and, at times, require additional processing in order to represent the call site nodes in the type-propagation graph with accurate TPSs. According to one embodiment, when an update to the TPS of a call site has been triggered by an update to the TPS of the call sites' receiver, the CGAA automatically determines whether the method can be resolved to call to a new and as yet unknown call target. If a new call target is discovered, it is added to the callee list of the call sites, and all of the argument nodes of the call site are added to the worklist. The callee list is used to create the edges between arguments at call sites to formal parameters of the callees, such as edges 162 and 164. A drawback of this is that all call targets get notified when the arguments are added to the worklist. The approximate equality function described above makes the added computation burden less intensive. However, this handling of a call site node does not require a merge of reachable types because the receiver node of the call sites is the same node that triggered the update.

When an update to the TPS of a call site has been triggered by an update to the TPS of an argument node, all current callees of the call site must be notified, such that the change is propagated to all currently known call targets. That means that all of the respective argument nodes must also be added to the worklist. Types are joined during the process.

When an update to the TPS of a call site has been triggered by an update to the return value of one of the callees of a call site, the return set of the call site must be updated. Such an update is relevant when the called method returns an object type, and therefore has a non-void and non-primitive return type. All nodes that depend on the call result are updated.

Ranking Call Graph Edges

According to an embodiment, the CGAA ranks the call relationships in the resulting call graph based on the TPSs of the nodes. This allows a user of the call graph to quickly determine the most or least likely call relationships in the call graph. According to an embodiment, a client may even request a final call graph that contains only edges that exceed a certain threshold of probability, which reduces the size of the final call graph according to the needs of the client.

For example, a user that is a bug detection application may use only those call graph edges that are above a certain high threshold, such as 0.75, to ensure that the detected bugs are highly likely to be present at run-time. As another example, a user that is a security auditing application uses all call graph edges over 0.10 probability, which allows the application to be highly inclusive of call edges that may occur at run-time without considering all highly-unlikely types (which would cause the user to utilize an unnecessary amount of processing power reviewing the unlikely edges).

Creating Multiple Call Graphs

Since different client analyses can be interested in dissimilar features or information, there is no need for them to operate on the same call graph. While computing multiple call graphs can introduce an overhead when many different kinds of analyses are required to be executed either sequentially or concurrently, the specialized call graphs improve the client analysis precision. Moreover, a more precise analysis means that the end user of the analysis has to review fewer reports, which saves time. Thus, according to an embodiment, the CGAA produces, from a given type-propagation graph, any number of call graphs with any threshold probability values, as requested by a client.

For example, multiple call graphs are useful in a bug detection tool that has different levels of severity for different types of defects that it reports. Specifically, it may be known that allowing application code to indirectly access certain methods in a library is a cause of a security vulnerability with known exploits. The bug detection tool reports any vulnerabilities of this type in the library with a very low probability threshold so that the developers of the library can carefully inspect any possibility of the exploit occurring. At the same time, the bug detection tool identifies bugs relating to incorrect memory management in the same library, which might result in wasting resources. Because this is a much less serious problem, developers require reports of this type with a much higher probability, so that they don't have to spend time reviewing many potentially incorrect reports.

To produce the required call graphs according to this example, after ranking the edges of the type-propagation graph, the CGAA produces a first very inclusive call graph, which includes all edges from the type-propagation graph, or which includes all edges with at least a low probability (e.g., P (0.10)), for use in applications requiring a low probability threshold. The CGAA further produces a second more exclusive call graph that includes only edges from the type-propagation graph that have a high probability (e.g., P (0.90)), for use in applications requiring a high probability threshold over the same computer program.

Hardware Overview

According to one embodiment, the techniques for propagating type tuples through a type-propagation graph and producing a call graph with ranked edges described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
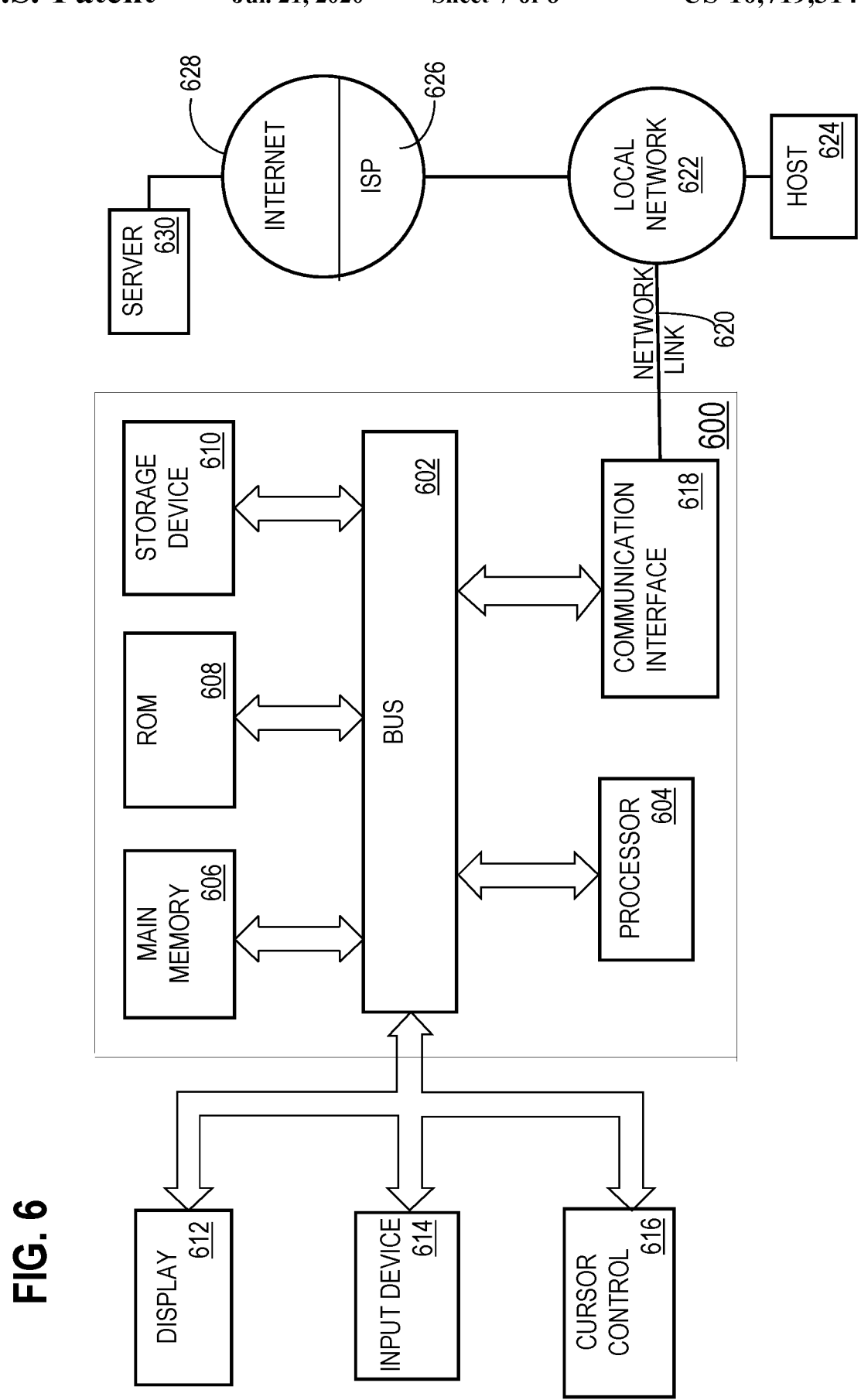
FIG. 6 depicts a computer system that may be used in an embodiment.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   creating a type-propagation graph that maps call relationships based on particular computer code;
   wherein the type-propagation graph comprises a plurality of nodes that represent respective program variables that are referred to in the particular computer code;
   for each node of a set of nodes of the plurality of nodes:
      identifying one or more types that are associated, in the particular computer code, with a particular program variable that is represented by said each node,
      determining a respective probability value for each of the one or more types that are associated with the particular program variable, wherein the probability value for a particular type, of the one or more types, represents a probability that the particular program variable is of the particular type during any given execution of the particular computer code, and
      associating said each node with one or more type tuples, wherein each type tuple, of the one or more type tuples, includes information identifying a respective type of the one or more types and the determined probability value that was identified for the respective type; and
   propagating type tuples across the plurality of nodes;
   wherein the method is performed by one or more computing devices.

2. The method of claim 1, wherein the particular computer code is object-oriented.

3. The method of claim 1, wherein propagating type tuples across the plurality of nodes comprises:
   generating a generated type tuple for a particular node of the plurality of nodes;
   wherein the particular node is a child node of a first parent node and a second parent node in the plurality of nodes;
   wherein the first parent node is associated with a first type tuple comprising a particular type and a first probability value;
   wherein the second parent node is associated with a second type tuple comprising the particular type and a second probability value;
   wherein the generated type tuple for the particular node comprises the particular type and a third probability value that is based, at least in part, on the first probability value and the second probability value.

4. The method of claim 3, wherein the type-propagation graph includes information identifying, for the particular node, the first parent node and the particular parent node.

5. The method of claim 3, wherein:
   the first parent node is further associated with a third type tuple comprising a second type and a fourth probability value;
   the method further comprises:
      determining a fifth probability value based, at least in part, on the fourth probability value;
      assigning, to the particular node, a second generated type tuple that comprises the second type and the fifth probability value.

6. The method of claim 5, further comprising:
   determining that the second parent node is not associated with any type tuple that comprises the second type;
   wherein, in response to determining that the second parent node is not associated with any type tuple that comprises the second type, said determining the fifth probability value is further based on a nil probability of the second parent node being associated with the second type.

7. The method of claim 5, further comprising:
   weighting the fourth probability value based on the third type tuple satisfying a condition of a configurable parameter, to produce a weighted fourth probability value;
   wherein the fourth probability value, which is used, at least partially, as a basis of said determining the fifth probability value, is the weighted fourth probability value.

8. The method of claim 1, further comprising:
   identifying a public function that is defined in the particular computer code; and
   wherein creating the type-propagation graph comprises representing, as a program variable in the type-propagation graph, a particular argument of the public function.

9. The method of claim 1, wherein:
   a particular node, of the set of nodes, represents a particular unknown element in the particular computer code;
   the particular unknown element is associated with particular one or more types; and
   for the particular node, determining a respective probability value for each of the particular one or more types that are associated with the particular unknown element, comprises:
      identifying a declared type for the particular unknown element, identifying, in configuration information, a plurality of features associated with the declared type, and based on the plurality of features, determining probabilities for the particular one or more types associated with the particular unknown element.

10. The method of claim 9, wherein:

the particular unknown element is a particular argument of a public function in the particular computer code;

the method further comprises:

identifying one or more call sites, in the particular computer code, that invoke the public function;

wherein the one or more call sites identify one or more call-site-identified types for the particular argument; and weighting probability values of the one or more identified types, of the one or more types associated with the particular program variable, differently than other types associated with the particular program variable.

11. One or more non-transitory computer-readable media storing one or more sequences of instructions that, when executed by one or more processors, cause:

creating a type-propagation graph that maps call relationships based on particular computer code;

wherein the type-propagation graph comprises a plurality of nodes that represent respective program variables that are referred to in the particular computer code;

for each node of a set of nodes of the plurality of nodes:

identifying one or more types that are associated, in the particular computer code, with a particular program variable that is represented by said each node, determining a respective probability value for each of the one or more types that are associated with the particular program variable, wherein the probability value for a particular type, of the one or more types, represents a probability that the particular program variable is of the particular type during any given execution of the particular computer code, and associating said each node with one or more type tuples, wherein each type tuple, of the one or more type tuples, includes information identifying a respective type of the one or more types and the determined probability value that was identified for the respective type; and propagating type tuples across the plurality of nodes.

12. The one or more non-transitory computer-readable media of claim 11, wherein the particular computer code is object-oriented.

13. The one or more non-transitory computer-readable media of claim 11, wherein propagating type tuples across the plurality of nodes comprises:

generating a generated type tuple for a particular node of the plurality of nodes;

wherein the particular node is a child node of a first parent node and a second parent node in the plurality of nodes;

wherein the first parent node is associated with a first type tuple comprising a particular type and a first probability value;

wherein the second parent node is associated with a second type tuple comprising the particular type and a second probability value;

wherein the generated type tuple for the particular node comprises the particular type and a third probability value that is based, at least in part, on the first probability value and the second probability value.

14. The one or more non-transitory computer-readable media of claim 13, wherein the type-propagation graph includes information identifying, for the particular node, the first parent node and the second parent node.

15. The one or more non-transitory computer-readable media of claim 13, wherein:

the first parent node is further associated with a third type tuple comprising a second type and a fourth probability value;

the one or more sequences of instructions further comprise instructions that, when executed by one or more processors, cause:

determining a fifth probability value based, at least in part, on the fourth probability value;

assigning, to the particular node, a second generated type tuple that comprises the second type and the fifth probability value.

16. The one or more non-transitory computer-readable media of claim 15, wherein the one or more sequences of instructions further comprise instructions that, when executed by one or more processors, cause:

determining that the second parent node is not associated with any type tuple that comprises the second type;

wherein, in response to determining that the second parent node is not associated with any type tuple that comprises the second type, said determining the fifth probability value is further based on a nil probability of the second parent node being associated with the second type.

17. The one or more non-transitory computer-readable media of claim 15, wherein the one or more sequences of instructions further comprise instructions that, when executed by one or more processors, cause:

weighting the fourth probability value based on the third type tuple satisfying a condition of a configurable parameter, to produce a weighted fourth probability value;

wherein the fourth probability value, which is used, at least partially, as a basis of said determining the fifth probability value, is the weighted fourth probability value.

18. The one or more non-transitory computer-readable media of claim 11, wherein the one or more sequences of instructions further comprise instructions that, when executed by one or more processors, cause:

identifying a public function that is defined in the particular computer code; and wherein creating the type-propagation graph comprises representing, as a program variable in the type-propagation graph, a particular argument of the public function.

19. The one or more non-transitory computer-readable media of claim 11, wherein:

a particular node, of the set of nodes, represents a particular unknown element in the particular computer code;

the particular unknown element is associated with particular one or more types; and for the particular node, determining a respective probability value for each of the particular one or more types that are associated with the particular unknown element, comprises:

identifying a declared type for the particular unknown element, identifying, in configuration information, a plurality of features associated with the declared type, and based on the plurality of features, determining probabilities for the particular one or more types associated with the particular unknown element.

20. The one or more non-transitory computer-readable media of claim 19 wherein:
- the particular unknown element is a particular argument of a public function in the particular computer code;
- the one or more sequences of instructions further comprise instructions that, when executed by one or more processors, cause:
  - identifying one or more call sites, in the particular computer code, that invoke the public function;
  - wherein the one or more call sites identify one or more call-site-identified types for the particular argument;
- wherein the particular one or more types associated with the particular unknowon element comprise the one or more cell-site-identified types; and
  - weighting probability values of the one or more call-site-identified types, of the particular one or more types associated with the particular unknown element, differently than other types of the particular one or more types associated with the particular unknown element.

\* \* \* \* \*

UNITED STATES PATENT AND TRADEMARK OFFICE
CERTIFICATE OF CORRECTION

PATENT NO. : 10,719,314 B2
APPLICATION NO. : 16/200045
DATED : July 21, 2020
INVENTOR(S) : Lu et al.

Page 1 of 2

It is certified that error appears in the above-identified patent and that said Letters Patent is hereby corrected as shown below:

On the Title Page

On page 2, Column 1, item (56) under Other Publications, Line 1, delete ""CloningBased ContextSensitive" and insert -- "Cloning Based Context Sensitive --, therefor.

On page 2, Column 1, item (56) under Other Publications, Line 6, delete "ScienceCarnegie" and insert -- Science Carnegie --, therefor.

In the Drawings

On sheet 2 of 8, in FIG. 2, under Reference Numeral 208, Line 1, delete "TYPETUPLES," and insert -- TYPE TUPLES, --, therefor.

In the Specification

In Column 6, Line 55, delete "Y;" and insert -- y; --, therefor.

In Column 10, Line 31, after "object" insert -- . --.

In Column 15, Line 47, delete "calculated" and insert -- calculate --, therefor.

In the Claims

In Column 25, Line 14, in Claim 10, before "and" insert -- wherein the particular one or more types associated with the particular unknown element comprise the one or more call-site-identified types; --.

In Column 25, Lines 15-16, in Claim 10, delete "identified" and insert -- call-site-identified --, therefor.

In Column 25, Line 16, in Claim 10, before "one" insert -- particular --.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*

In Column 25, Line 17, in Claim 10, delete "program variable," and insert -- unknown element, --, therefor.

In Column 25, Line 18, in Claim 10, before "associated" insert -- of the particular one or more types --.

In Column 25, Lines 18-19, in Claim 10, delete "program variable." and insert -- unknown element. --, therefor.

In Column 27, Line 13, in Claim 20, delete "unknowon" and insert -- unknown --, therefor.

In Column 27, Line 14, in Claim 20, delete "cell-site-identified" and insert -- call-site-identified --, therefor.